(No Model.)

F. GILBERT.
AXLE FOR TWO WHEELED VEHICLES.

No. 284,626. Patented Sept. 11, 1883.

WITNESSES
O. W. Engel
Jos. W. Breen

INVENTOR
Frank Gilbert
By Thos. S. Hall
ATTORNEY

N. PETERS. Photo-Lithographer, Washington, D. C.

UNITED STATES PATENT OFFICE.

FRANK GILBERT, OF CLEVELAND, OHIO, ASSIGNOR OF ONE-HALF TO CHARLES W. TRITT AND JEHU McNEAL, BOTH OF UNION CITY, IND.

AXLE FOR TWO-WHEELED VEHICLES.

SPECIFICATION forming part of Letters Patent No. 284,626, dated September 11, 1883.

Application filed July 5, 1883. (No model.)

*To all whom it may concern:*

Be it known that I, FRANK GILBERT, a citizen of the United States, residing at Cleveland, county of Cuyahoga, State of Ohio, have invented certain new and useful Improvements in Axles for Two-Wheeled Vehicles; and I do hereby declare the following to be a description of the same and of the manner of constructing and using the invention in such full, clear, concise, and exact terms as to enable any person skilled in the art to which it appertains to construct and use the same, reference being had to the accompanying drawings, which form a part of the specification, the principle of the invention being herein explained, and the best mode in which I have contemplated applying that principle, so as to distinguish it from other inventions.

The object of this invention is to provide an improved form of axle for two-wheeled vehicles.

Figure 1:
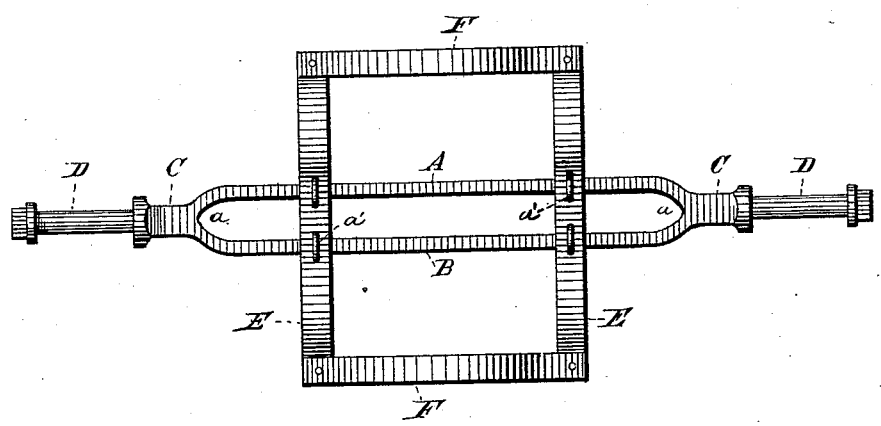
Figure 2:
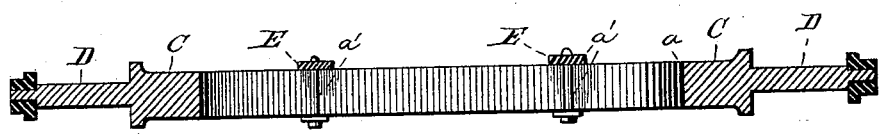

In the drawings, Figure 1 is a plan view of an axle made according to the invention, and having a full platform-spring secured thereto. Fig. 2 is a vertical section through the axle.

The metal axle is formed with two longitudinal beds, A and B, uniting at their extremities to form the two single arms C, respectively joined to the two axle-spindles D. These two beds are formed substantially parallel with and on opposite sides of a straight line joining the axle-spindles. At their extremities they unite together in curved line, as shown at *a*. They are located substantially in the same horizontal plane with the axle-spindles. This construction provides two separate bearings for the springs, one bearing being forward and the other bearing being rearward of a line passing lengthwise through the center of the axle-spindles. The axle is enabled by this double-bed construction to provide stable bearings for the springs, as the latter are supported in equilibrium upon the forward and rearward bearings thus provided.

The full platform-spring shown in the drawings consists of two side springs, E, located transversely on said beds, and secured by clips *a'* to each of them, and two cross-springs, F, which join the extremities of the side springs. Instead of this platform-spring, however, any other form of spring adapted for a two-wheeled vehicle may be used.

In using this form of axle the shafts are secured thereto, and not to the body of the vehicle. Various forms of two-wheeled vehicles have heretofore attached the shafts to the axle, instead of to the vehicle-body, the object being to obviate the disagreeable motion imparted to the vehicle-body when the shafts are attached thereto; but, in addition to the attainment of this object, my invention provides a strong and durable form of axle. When the vehicle-body is obliged to depend for its positions solely upon its connection with the springs, the latter have a great strain thereby imposed on them, and the bearings of such springs have a corresponding strain and burden placed on them. To provide bearings practically able to withstand the wear thus imposed and fulfill the work thus required is the object of my invention, and the two longitudinal axle-beds have been found to attain the desired result.

What I claim is—

1. The combination, with a metallic axle formed with two longitudinal beds, of a spring located transversely on said beds, substantially as set forth.

2. The combination, with an axle formed with two beds substantially parallel with and on opposite sides of a straight line joining the axle-spindles, of a spring resting upon and secured to both said beds, substantially as set forth.

In testimony that I claim the foregoing to be my invention I have hereunto set my hand this 29th day of June, A. D. 1883.

FRANK GILBERT.

Witnesses:
THOS. B. HALL,
JOS. W. BREEN.